United States Patent
Onishi et al.

(10) Patent No.: US 7,284,647 B2
(45) Date of Patent: Oct. 23, 2007

(54) CLUTCH DEVICE FOR AUTOMATIC TRANSMISSION

(75) Inventors: Hirofumi Onishi, Aichi-gun (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 247 days.

(21) Appl. No.: 11/169,714

(22) Filed: Jun. 30, 2005

(65) Prior Publication Data

US 2006/0021845 A1 Feb. 2, 2006

(30) Foreign Application Priority Data

Jul. 6, 2004 (JP) .............................. 2004-199753

(51) Int. Cl.
*F16D 25/0638* (2006.01)

(52) U.S. Cl. .............................. 192/85 AA; 192/106 F

(58) Field of Classification Search ............. 192/106 F
See application file for complete search history.

(56) References Cited

U.S. PATENT DOCUMENTS 6,758,786 B2 * 7/2004 Lepelletier .................. 475/296

FOREIGN PATENT DOCUMENTS

| JP | A 2003-106341 | | 4/2003 |
|---|---|---|---|
| JP | 2003130085 A | * | 5/2003 |
| JP | A 2004-137422 | | 5/2004 |

* cited by examiner

*Primary Examiner*—Richard M Lorence
(74) *Attorney, Agent, or Firm*—Oliff & Berridge, PLC

(57) ABSTRACT

A clutch device for an automatic transmission, wherein a piston is disposed radially outwardly of a drum supporting frictional coupling elements, and cooperates with the drum to define a hydraulic pressure chamber, and a balancer is disposed on one side of the piston which is remote from the hydraulic pressure chamber, the balancer cooperating with the piston to define a canceling chamber. The clutch device is characterized in that: the drum has a stepped portion, and a shaft to which the drum is fixed has a flange portion; and the drum is fixed to the shaft such that the stepped portion of the drum and the flange portion of the shaft cooperate to define therebetween an oil sump, and the drum has an oil hole for communication between the oil sump and the canceling chamber.

9 Claims, 1 Drawing Sheet

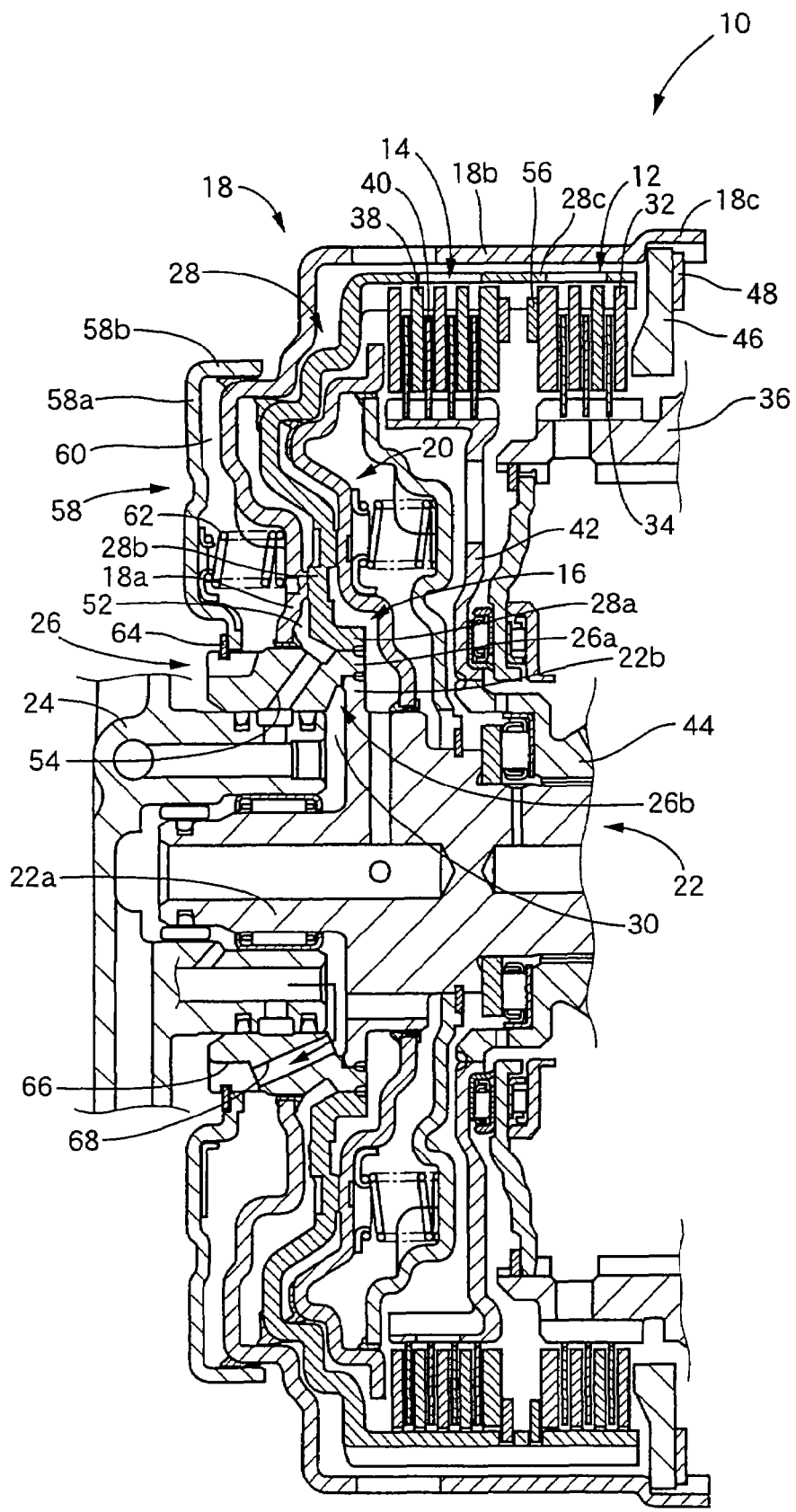

CLUTCH DEVICE FOR AUTOMATIC TRANSMISSION

The present application is based on Japanese Patent Application No. 2004-199753.

TECHNICAL FIELD

1. Field of the Invention

The present invention relates to a clutch device to be provided in an automatic transmission, and more particularly a clutch device wherein a canceling chamber for canceling a centrifugal hydraulic pressure in a hydraulic pressure chamber defined by a piston and a clutch drum is defined by the piston and a balancer disposed on an outer side of the piston.

2. Discussion of the Prior Art

There is known a clutch device wherein a piston is disposed radially outwardly of a drum supporting frictional coupling elements, and cooperates with the drum to define a hydraulic pressure chamber. (Patent document 1, that is, JP-2003-106341A, discloses an example of such a clutch device.) In the clutch device discloses in this patent document 1, a balancer (referred to as "a canceling plate" in the patent document 1) is disposed on an outer side of the piston which is removed from the hydraulic pressure chamber, and cooperates with the piston to define a canceling chamber for canceling a centrifugal hydraulic pressure in the above-indicated hydraulic pressure chamber.

In the clutch device of the patent document 1, a member that holds the balancer at its radially inner end has a radial flange portion which defines an oil sump for storing a working oil fed in a radially outward direction, and the oil sump has oil holes formed in its bottom wall such that the oil holes are in communication with the canceling chamber, so that the working oil is supplied to the canceling chamber through the oil holes. Thus, the above-indicated member having the radial flange portion must be formed in a comparatively complicated shape, so that the clutch device suffers from a problem of an accordingly high cost of manufacture. Further, it is difficult to remove burrs at a point of communication between the oil sump and the oil holes, giving rise to a risk of deterioration of functional performance of the clutch device due to residual burrs.

The present invention was made in view of the background art described above. It is an object of this invention to provide a clutch device which is economical to manufacture and which has an improved functional performance.

SUMMARY OF THE INVENTION

The object indicated above may be achieved according to the principle of the present invention, which provides a clutch device for an automatic transmission, wherein a piston is disposed radially outwardly of a drum supporting frictional coupling elements, and cooperates with the drum to define a hydraulic pressure chamber, and a balancer is disposed on one side of the piston which is remote from the hydraulic pressure chamber, the balancer cooperating with the piston to define a canceling chamber, the clutch device being characterized in that: the drum has a stepped portion, and a shaft to which the drum is fixed has a flange portion; and the drum is fixed to the shaft such that the stepped portion of the drum and the flange portion of the shaft cooperate to define therebetween an oil sump, and the drum has an oil hole for communication between the oil sump and the canceling chamber.

In the clutch device according to the present invention, the oil sump is formed between the stepped portion of the inner drum and the flange portion of the shaft. Therefore, the inner drum need not be formed in a complicated shape, so as to provide a flange portion, so that the cost of manufacture of the clutch device can be reduced. It is also noted that since the oil sump is defined by the above-indicated two members, the shape of a portion of the inner drum at which the oil hole is communicated with the oil sump can be made simpler in the present embodiment, than in a case in which the oil hole communicating with the canceling chamber was formed so as to be open to the bottom of the oil sump formed in only one member. Accordingly, the operation to remove burrs from the inner drum can be easily accomplished, and the clutch device has an improved functional performance.

BRIEF DESCRIPTION OF THE DRAWING

The drawing is a cross sectional view showing a portion of an automatic transmission including a clutch device constructed according to the present invention.

DESCRIPTION OF PREFERRED EMBODIMENT

Referring to the drawing, the present invention will be described in detail. The drawing is a cross sectional view showing a portion of an automatic transmission including a clutch device 10.

The clutch device 10 includes a drum 16 supporting first frictional coupling elements 12 and second frictional coupling elements 14, a first piston 18 disposed radially outwardly of the drum 16 so as to cover the drum 16, and a second piston 20 disposed radially inwardly of the drum 16.

A rotary shaft in the form of an input shaft 22 is supported by a casing 24 of the automatic transmission such that the input shaft 22 is rotatable relative to the casing 24. The input shaft 22 has a flange portion 22b at a position near its end portion 22a, at which the input shaft 22 is supported by the casing 24. The flange portion 22b extends radially outwardly and perpendicularly to the axis of the input shaft 22. The input shaft 22 is a turbine shaft of a torque converter rotated by a drive power source such as an engine.

The drum 16 consists of an inner drum 26 and an outer drum 28. The inner drum 26 is a cylindrical member which has a substantially constant outside diameter and which is disposed radially outwardly of the end portion 22a of the input shaft 22. The inner drum 26 includes a thin-walled end portion 26a on the side of the second piston 20. The thin-walled end portion 26a has a relatively large inside diameter. The inner circumferential surface of the inner drum 26 has a stepped portion 26b. The thin-walled end portion 26a has an end face which is flush with one of opposite surfaces of the flange portion 22b of the input shaft 22 which is on the side of the second piston 20. The inner drum 26 and the input shaft 22 are welded to each other at the outer circumferential surface of the flange portion 22b and the inner circumferential surface of the thin-walled end portion 26a, such that an oil sump 30 is formed radially inwardly of the stepped portion 26b.

The outer drum 28 is a cylindrical member which is open at one axial end thereof in the axial direction and which consists of an inner cylindrical portion 28a, an annular bottom portion 28b, and an outer cylindrical portion 28c. The annular bottom portion 28b has a radially inner end connected to the inner cylindrical portion 28a, and the outer cylindrical portion is connected to a radially outer end of the annular bottom portion 28b.

The inner cylindrical portion 28a is fitted on the thin-walled end portion 26a of the inner drum 26, and the end face of the inner cylindrical portion 28a which is on the side of the second piston 20 is flush with the corresponding end face of the thin-walled end portion 26a. The inner and outer drums 26, 28 are welded to each other at the inner circumferential surface of the inner cylindrical portion 28a and the outer circumferential surface of the thin-walled end portion 26a. The annular bottom portion 28b extends generally in the radial direction of the input shaft 22, and is connected at its radially inner end to the axial end of the inner cylindrical portion 28a which is on the side of the first piston 18.

The outer cylindrical portion 28c of the outer drum 28 extends from the annular bottom portion 28b in the axial direction toward the second piston 20. The outer cylindrical portion 28c holds a plurality of inwardly extending friction plates 32 of the first frictional coupling elements 12, and a plurality of inwardly extending friction plates 38 of the second group of frictional coupling elements 14, such that the friction plates 32 are splined to a portion of the inner circumferential surface of the outer cylindrical portion 28c, which portion is relatively near the axial open end of the outer cylindrical portion 28c. The first frictional coupling elements 12 consist of the above-described plurality of inwardly extending friction plates 32, and a plurality of outwardly extending friction plates 34 each of which is interposed between the adjacent two inwardly extending friction plates 32. The plurality of outwardly extending friction plates 34 are splined to the outer circumferential surface of a ring gear 36 functioning as a clutch hub.

The outer cylindrical portion 28c of the outer drum 28 also holds a plurality of inwardly extending friction plates 38 of the second frictional coupling elements 14, such that the friction plates 38 are splined to a portion of the inner circumferential surface which is nearer the annular bottom portion 28b than to the portion at which the friction plates 32 are supported. The second frictional coupling elements 14 consists of the above-described plurality of inwardly extending friction plates 38, and a plurality of outwardly extending friction plates 40 each of which is interposed between the adjacent two inwardly extending friction plates 38. These outwardly extending friction plates 40 are splined to the outer circumferential surface of a clutch hub 42. This clutch hub 42 is fixed at its radially inner end to a sun gear 44 which is fitted on the input shaft 22, so that the clutch hub 42 is rotated with the sun gear 44.

The first piston 18 consists of an annular bottom-plate portion 18a, a cylindrical portion 18b and a cylindrical axial extension 18c. The cylindrical portion 18b is connected to a radially inner end of the annular bottom-plate portion 18a, so as to cover the outer cylindrical portion of the outer drum 18. The cylindrical axial extension 18c is connected to the cylindrical portion 18b, and extends axially outwardly of the outer drum 28. The axial extension 18c has a splined inner circumferential surface having the same inside diameter as the inner circumferential surface of the cylindrical portion 18b.

A presser member 46 in the form of an annular plate is splined at its radially outer end to the splined inner circumferential surface of the cylindrical axial extension 18c. The presser member 46 is held at one of its opposite annular surfaces with the end face of the cylindrical portion 18b of the first piston 18, and at the other annular surface with a retainer ring 48 fixed to the inner circumferential surface of the cylindrical axial extension 18c, so that the pressure member 46 is not rotatable and axially movable relative to the first piston 18.

The annular bottom-plate portion 18a of the first piston 18 is axially slidable at its inner circumferential surface on the inner drum 26. The annular bottom plate-portion 18a of the first piston 18 and the annular bottom portion 28b of the outer drum 28 cooperate to define therebetween a first hydraulic pressure chamber 52. When a working oil is fed to the first hydraulic pressure chamber 52 through an oil hole 54 formed through the inner drum 26, the first piston 18 is moved in the axial direction that causes the annular bottom-plate portion 18a is moved away from the annular bottom portion 28b of the outer drum 28. As a result, the presser member 46 fixed to the axial extension 18c of the first piston 18 is brought into pressing contact with the first frictional coupling elements 12. A retainer ring 56 is fixed to the outer cylindrical portion 28c of the outer drum 28 such that the retainer ring 56 is located on one side of the first frictional coupling elements 12 which is remote from the presser member 46. The retainer ring 56 is provided to prevent an axial movement of the first frictional coupling elements 12 toward the second frictional coupling elements 14. In this arrangement, the inwardly extending friction plates 32 and outwardly extending friction plates 34 of the first frictional coupling elements 12 are forced against each other when the first frictional coupling elements 12 are pressed by the presser member 46.

On one of opposite axial sides of the annular bottom-plate portion 18a which is remote from the first hydraulic pressure chamber 52, there is disposed a balancer 58 such that the balancer 58 is fitted at its inner circumferential surface on the outer circumferential surface of the inner drum 26. The balancer 58 consists of an annular plate portion 58a substantially perpendicular to the axis of the inner drum 26, and a cylindrical portion 58b which is connected to a radially outer end of the annular plate portion 58a such that the cylindrical portion 58b extends towards the first piston 18. The balancer 58 cooperates with the annular bottom-plate portion 18a of the first piston 18, to define therebetween a second hydraulic pressure chamber 60.

A return spring 62 is interposed between the balancer 58 and the annular bottom-plate portion 18a of the first piston 18, to bias the balancer 58 and annular bottom-plate portion 18a in opposite axial directions away from each other. A retainer ring 64 is fixed to the outer circumferential surface of the inner drum 26, and the balancer 58 is held at its radially inner end in abutting contact with the retainer ring 64, at one of its opposite surfaces of the balancer 58 which is remote from the first piston 18. Accordingly, the balancer 58 is prevented from moving in the axial direction away from the first piston 18.

The inner drum 26 has axial grooves 66 formed in a portion thereof on which the balancer 58 is fitted. The axial grooves 66 are formed so as to extend in the axial direction of the inner drum 26, for communication of the second hydraulic pressure chamber 60 with a space formed on an outer side of the balancer 58 (on one of opposite sides of the balancer 58, which is remote from the second hydraulic pressure chamber 60). For example, the eight axial grooves 66 are formed such that the axial grooves 66 are equally spaced from each other in the circumferential direction of the inner drum 26.

The inner drum further has oil holes 68 each of which is open at one of its opposite ends to the bottom (radially outer end) of the oil sump 30, and at the other end to the corresponding one of the axial grooves 66, so that the oil sump 30 and the second hydraulic pressure chamber 60 are held in communication with each other, through the oil holes 68. (Although the oil holes 68 may be provided for all of the axial grooves 66, respectively, the oil hole or holes 68 may be provided for a selected one or ones of the axial grooves 66.) The oil holes 68 function as oil supply holes for supplying the second hydraulic pressure chamber 60 with the working oil. When a centrifugal hydraulic pressure is developed in the first hydraulic pressure chamber 52, the working fluid is fed from the oil sump 30 to the second hydraulic pressure chamber 60 through the oil holes 68 and the axial grooves 66, so that the second hydraulic pressure chamber 60 functions as a canceling chamber for canceling the centrifugal hydraulic pressure in the first hydraulic pressure chamber 52.

It will be understood from the foregoing description of the present embodiment that the oil sump 30 is formed between the stepped portion 26*b* of the inner drum 26 and the flange portion 22*b* of the input shaft 22. Therefore, the inner drum 26 need not be formed in a complicated shape, so as to provide a flange portion, so that the cost of manufacture of the clutch device can be reduced. It is also noted that since the oil sump 30 is defined by the above-indicated two members (namely, the inner drum 26 and the input shaft 22), the shape of a portion of the inner drum 26 at which the oil holes 68 are communicated with the oil sump 30 can be made simpler in the present embodiment, than in a case in which oil holes communicating with the second hydraulic pressure chamber (canceling chamber) 60 were formed so as to be open to the bottom of the oil sump 30 formed in only one member. Accordingly, the operation to remove burrs from the inner drum can be easily accomplished, and the clutch device has an improved functional performance.

While the preferred embodiment of the present invention has been described in detail by reference to the drawing, it is to be understood that the invention is not limited to the illustrated embodiment, but may be embodied with various changes and modifications which may occur to those skilled in the art.

What is claimed is:

1. A clutch device for an automatic transmission, comprising (a) a drum supporting frictional coupling elements, (b) a piston disposed radially outwardly of said drum and cooperating with the drum to define a hydraulic pressure chamber, (c) a shaft to which said drum is fixed, and (d) a balancer disposed on one side of said piston which is remote from said hydraulic pressure chamber, said balancer cooperating with said piston to define therebetween a canceling chamber, said clutch device being characterized in that:

said shaft has a radial flange portion, and said drum has a stepped portion and is fixed to said shaft such that said stepped portion of the drum and said radial flange portion of the shaft cooperate to define therebetween an oil sump; and said drum further has at least one oil hole for communication between said oil sump and said canceling chamber.

2. The clutch device according to claim 1, wherein said shaft is an input shaft of said automatic transmission.

3. The clutch device according to claim 2, wherein said input shaft is a turbine shaft of a torque converter which is driven by a drive power source.

4. The clutch device according to claim 1, wherein said drum includes an inner drum at which the drum is fixed to said shaft, and an outer drum which supports said frictional coupling elements, said inner drum having said stepped portion and said at least one oil hole.

5. The clutch device according to claim 4, wherein said inner drum has a plurality of axial grooves for communication between said canceling chamber and a space formed on one of opposite side of said balancer which is remote from said canceling chamber.

6. The clutch device according to claim 5, wherein said at least one oil hole consists of a plurality of oil holes communicating with said plurality of axial grooves.

7. The clutch device according to claim 5, wherein said plurality of axial grooves are equally spaced from each other in a circumferential direction of said inner drum.

8. The clutch device according to claim 6, wherein said plurality of oil holes communicate with said plurality of axial grooves, respectively.

9. The clutch device according to claim 4, wherein said inner drum further has a thin-walled end portion formed adjacent to said stepped portion, said inner drum and said shaft are welded to each other at an inner circumferential surface of said thin-walled end portion and an outer circumferential surface of said radial flange portion of said shaft.

* * * * *